Figure 1:
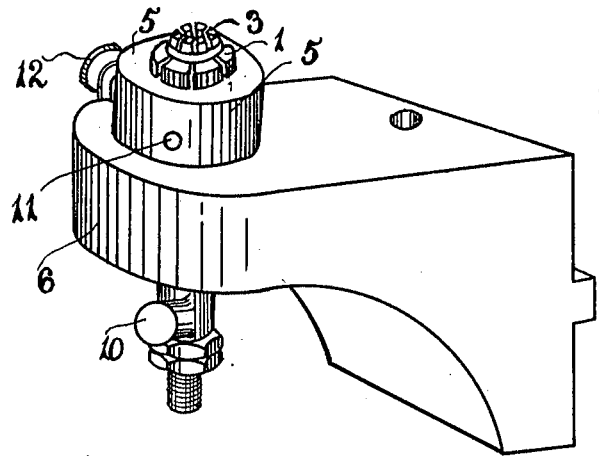

A. H. SMITH.
WORK HOLDER FOR MACHINE TOOLS AND THE LIKE.
APPLICATION FILED JULY 21, 1917.

1,273,417.                                                Patented July 23, 1918.

Inventor:-
Albert Henry Smith,
By:- B. Singer
Atty.

UNITED STATES PATENT OFFICE.

ALBERT HENRY SMITH, OF BIRMINGHAM, ENGLAND.

WORK-HOLDER FOR MACHINE-TOOLS AND THE LIKE.

1,273,417.      Specification of Letters Patent.      Patented July 23, 1918.

Application filed July 21, 1917. Serial No. 182,020.

*To all whom it may concern:*

Be it known that I, ALBERT HENRY SMITH, a subject of the King of Great Britain, residing at 155 St. Luke's road, Birmingham, in the county of Warwick, England, have invented a new and useful Work-Holder for Machine-Tools and the like; and I do hereby declare the following to be a full, clear, and exact description of the same.

My invention comprises improvements in work holders for machine tools and the like and refers to that class of such which are hand actuated for the purpose of gripping the work and holding it stationary while it is being operated upon in a milling machine, drilling machine, or the like; the object of the present invention being to provide an improved and simpler work holder for the specified purpose.

According to this invention the work holder has a split and externally tapered gripping part in combination with a correspondingly internally tapered fixed member, and an incline or inclines on the rear end of the fixed member together with an angularly movable hand actuated inclined or equivalent member carried by the gripping member and co-acting with the inclines on the fixed member, this angular movement being adapted to draw the externally tapered gripping member into the fixed member and thus hold the work.

A similarly controlled stop may be employed for locking the work holder in various angularly adjusted positions.

Referring to the drawings:—

Figure 1. is a perspective view of a work holder in position upon a table such as is employed in a milling or drilling machine.

Figure 2:
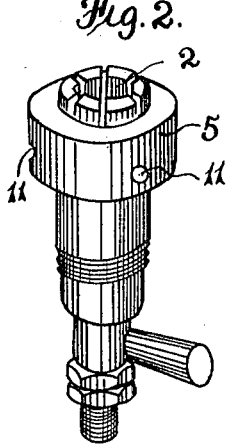

Fig. 2. is a perspective view of the work holder removed.

Figure 3:
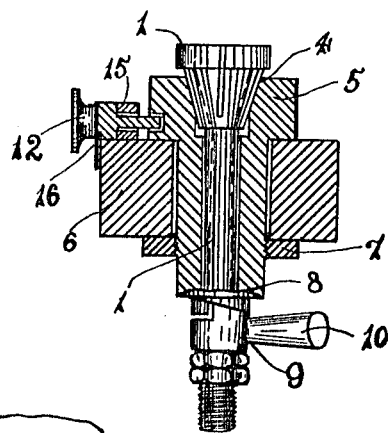
Figure 4:
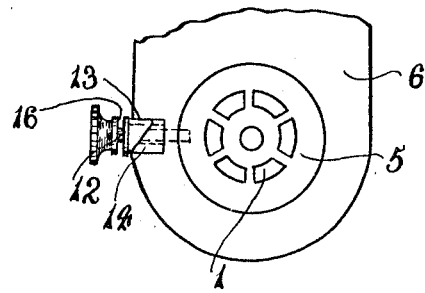

Fig. 3. is a longitudinal section through same, and

Fig. 4. is a plan.

In carrying this invention into practice as illustrated upon the accompanying drawings, the gripping member comprises a shank 1 having an opening 2 for receiving the work (such as the castle nut 3 illustrated in Fig. 1) and an externally tapered portion 4, this end of the gripping member being longitudinally split in order to permit its gripping diameter to vary in manner hereinafter explained. The shank 1 is preferably provided with a longitudinal hole *i. e.*, is hollow, to permit the bur to fall through.

This gripping member is located in a member 5 which is fixed against longitudinal movement and secured to the table 6 by a nut 7 preferably in such manner that it may, when desired, be rotated for the purpose hereinafter explained.

The member 5 has on its lower end a helical or other incline or inclines 8 and co-acting therewith is a corresponding incline or inclines 9 on the angularly movable handle 10 so that when the handle is moved to the right as viewed in Figs. 2 and 3 the inclines will cause the handle to move on the member 1. Said member 1 is provided with a pair of lock nuts which form an adjustable abutment behind the handle so that movement of the handle will draw the member 1 endwise thus drawing the tapered portion 4 into the fixed member 5 and closing the gripping end 2 about the work. The co-action of the inclines gives a very much quicker action than is possible with the use of screw threads as now commonly used.

To enable the holder to be used for milling notches say six in number in castle nuts, the member 5 is provided with three radial holes 11 which are adapted to be engaged by the plunger 12 mounted upon the table 6, the engagement of the parts 11, 12 insuring that the notches will be accurately spaced around the nut. The plunger 12 has inclines 13 co-acting with inclines 14 in a fixed member 15 the rotation of the plunger retracting it and when retracted the plunger is obviously held disengaged. The plunger is shown as held in its adjusted position by a spring 16.

What I claim then is:—

In a work holder for machine tools and the like the combination of a stationary member having an internally tapered hole and having an incline at its one end; a movable gripping member split at one end and having an externally tapered portion engaging with said internally tapered part of the stationary member; an angularly adjustable hand actuated member having inclines co-acting with the aforesaid incline and adapted when moved angularly to displace said gripping member longitudinally and thus grip the work; a bracket having an incline; and a plunger carried by said bracket and radially disposed in relation to the axes of the stationary member adapted to engage with any one of a plurality of recesses therein and provided with an incline co-acting with a corresponding incline on said bracket; for the purpose specified.

In testimony whereof I affix my signature.

ALBERT HENRY SMITH.